United States Patent
Good et al.

(10) Patent No.: US 9,973,600 B2
(45) Date of Patent: May 15, 2018

(54) SYSTEM AND METHODS FOR SCALABLE PACKET INSPECTION IN CLOUD COMPUTING

(71) Applicant: SECUREWORKS CORP., Wilmington, DE (US)

(72) Inventors: Daniel Good, Marietta, GA (US); Sai Bathina, Lawrenceville, GA (US); Ihor Bilyy, Canton, GA (US); Seungyoung Kim, Renton, WA (US)

(73) Assignee: SECUREWORKS CORP., Wilmington, DE (US)

( * ) Notice: Subject to any disclaimer, the term of this patent is extended or adjusted under 35 U.S.C. 154(b) by 91 days.

(21) Appl. No.: 15/146,359

(22) Filed: May 4, 2016

(65) Prior Publication Data
US 2017/0324847 A1    Nov. 9, 2017

(51) Int. Cl.
H04L 29/06    (2006.01)
H04L 12/803   (2013.01)
H04L 29/08    (2006.01)

(52) U.S. Cl.
CPC .......... *H04L 69/22* (2013.01); *H04L 47/125* (2013.01); *H04L 67/28* (2013.01)

(58) Field of Classification Search
CPC ........ H04L 69/22; H04L 47/125; H04L 67/28
USPC ........................................... 370/235
See application file for complete search history.

(56) References Cited

U.S. PATENT DOCUMENTS

| | | | |
|---|---|---|---|
| 6,710,786 B1 * | 3/2004 | Jacobs | G06F 9/465 709/229 |
| 7,243,371 B1 * | 7/2007 | Kasper | G06F 21/55 713/188 |
| 7,493,388 B2 * | 2/2009 | Wen | G06F 9/50 705/28 |
| 7,594,270 B2 | 9/2009 | Church et al. | |
| 7,672,236 B1 * | 3/2010 | Karunakaran | H04L 12/4625 370/230.1 |
| 8,079,081 B1 | 12/2011 | Lavrick et al. | |
| 8,156,553 B1 | 4/2012 | Church et al. | |
| 8,407,335 B1 | 3/2013 | Church et al. | |
| 8,578,393 B1 | 11/2013 | Fisher et al. | |
| 8,850,263 B1 | 9/2014 | Yourtee et al. | |
| 2003/0110258 A1 * | 6/2003 | Wolff | H04L 63/145 709/225 |
| 2005/0261985 A1 * | 11/2005 | Miller | G06F 17/30902 709/223 |
| 2006/0212712 A1 * | 9/2006 | Braverman | G06F 21/562 713/181 |
| 2007/0169194 A1 | 7/2007 | Church et al. | |

(Continued)

*Primary Examiner* — Stephen J Clawson
(74) *Attorney, Agent, or Firm* — Larson Newman, LLP

(57) ABSTRACT

A method for packet inspection in a computer network includes receiving a plurality of network streams from a plurality of client systems at a first load balancer; allocating the network streams across a proxy instances; and inspecting and filtering the network streams by the proxy instances. The method further includes forwarding the filtered network streams to a second load balancer; allocating the filtered network streams to a plurality of application instances; and processing and responding to the network streams at the application instances. The method still further includes inspecting and filtering the responses to the network streams by the proxy instances; and forwarding the response to the client systems.

20 Claims, 7 Drawing Sheets

(56) References Cited

U.S. PATENT DOCUMENTS

| | | | |
|---|---|---|---|
| 2009/0037492 A1* | 2/2009 | Baitalmal | G06F 17/30575 |
| 2010/0218254 A1* | 8/2010 | Gray, II | H04L 63/0236 |
| | | | 726/23 |
| 2012/0039332 A1* | 2/2012 | Jackowski | H04L 47/2441 |
| | | | 370/389 |
| 2013/0054806 A1* | 2/2013 | Francis | H04L 67/1002 |
| | | | 709/226 |
| 2013/0201989 A1* | 8/2013 | Hu | H04L 45/24 |
| | | | 370/392 |
| 2013/0227165 A1* | 8/2013 | Liu | H04L 67/1027 |
| | | | 709/238 |
| 2014/0259145 A1 | 9/2014 | Khandelwal et al. | |

\* cited by examiner

SYSTEM AND METHODS FOR SCALABLE PACKET INSPECTION IN CLOUD COMPUTING

FIELD OF THE DISCLOSURE

The present disclosure generally relates to information handling systems, and more particularly relates to scalable packet inspection in cloud computing.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method for packet inspection in a computer network includes receiving a plurality of network streams from a plurality of client systems at a first load balancer; allocating the network streams across a proxy instances; and inspecting and filtering the network streams by the proxy instances. The method further includes forwarding the filtered network streams to a second load balancer; allocating the filtered network streams to a plurality of application instances; and processing and responding to the network streams at the application instances. The method still further includes inspecting and filtering the responses to the network streams by the proxy instances; and forwarding the response to the client systems.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
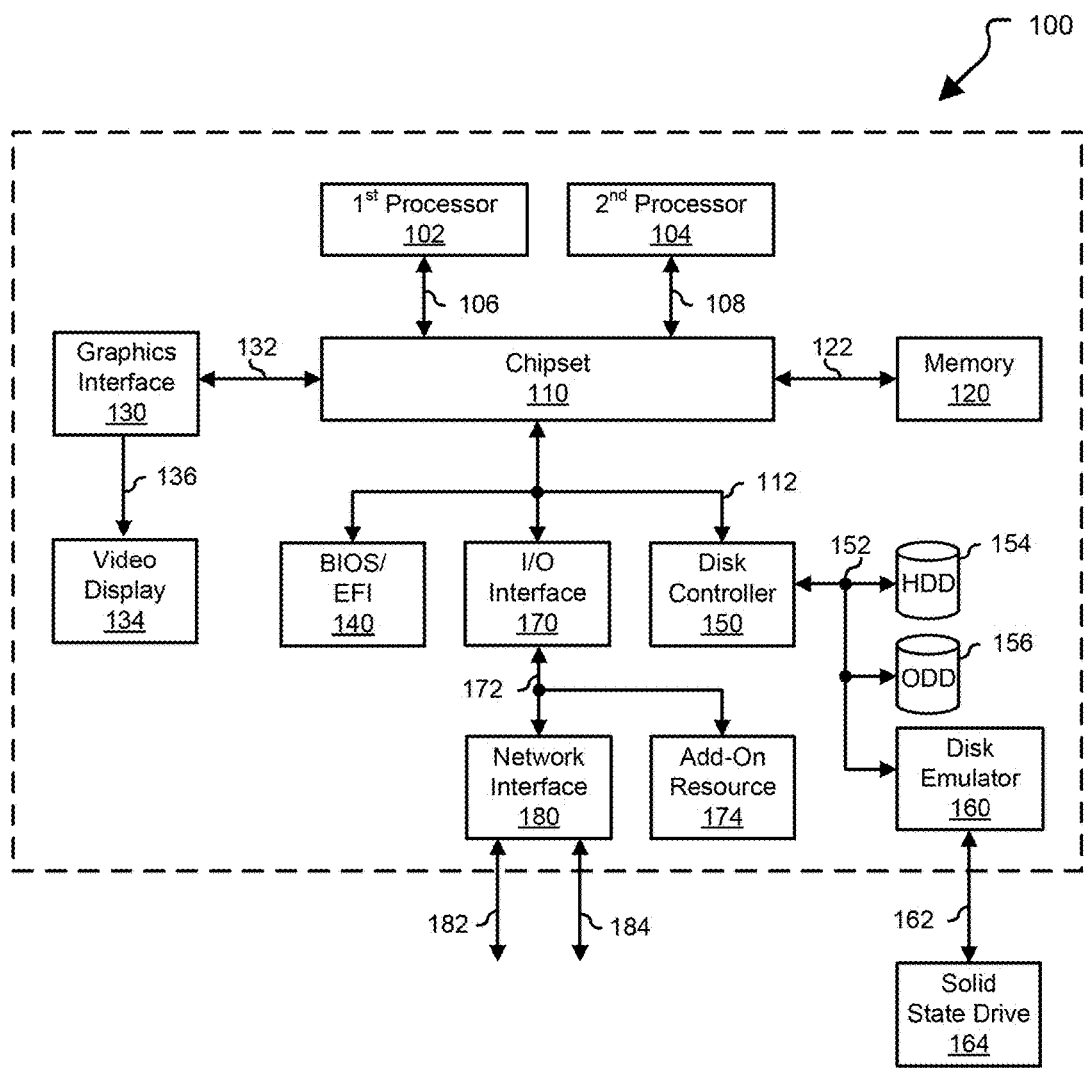
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Inspecting Packets in the Cloud

Organizations are becoming increasingly dependent on the cloud for their day to day operation. Companies are moving their data centers to both public and hybrid clouds. The need to protect the data and infrastructure in the cloud is growing as cloud adoption is increasing.

Figure 2:
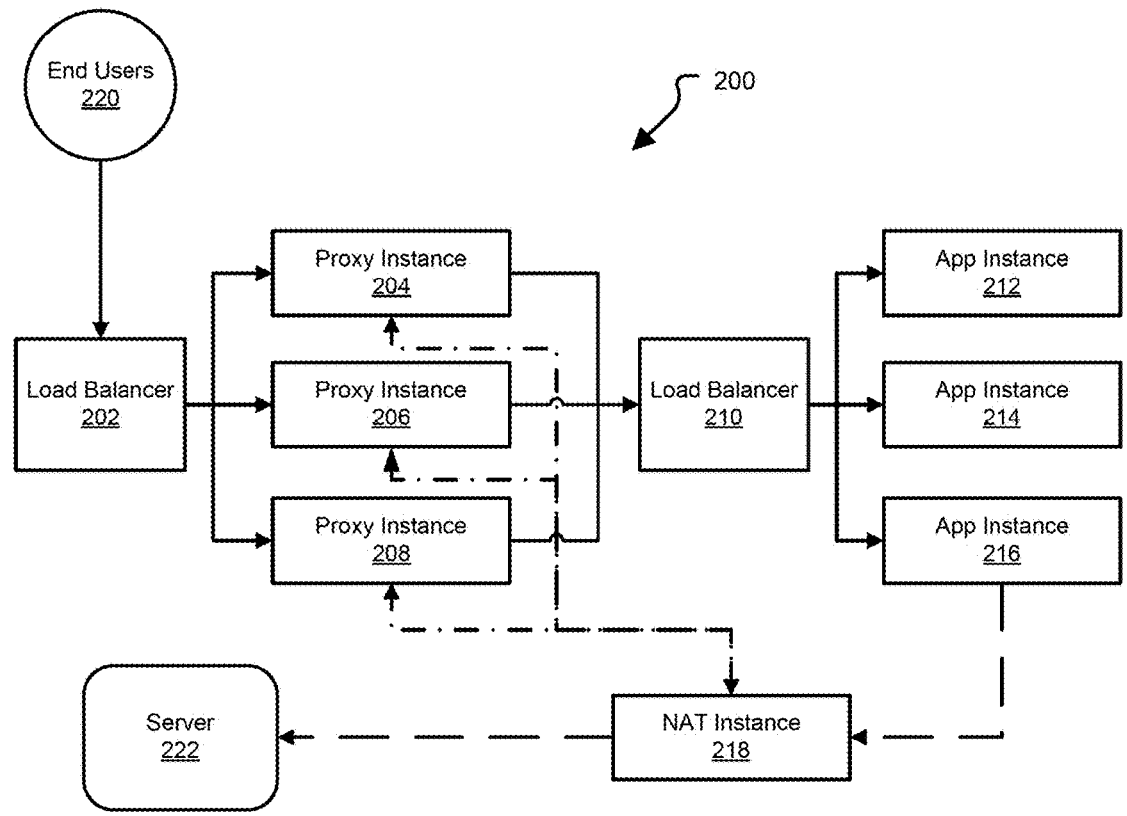
FIG. 2 is a block diagram illustrating a system for scalable packet inspection in the cloud, in accordance with various embodiments.

FIG. 2 is a diagram of a system 200 for inspecting packets in the cloud. System 200 can include a external load balancer 202, proxy instances 204, 206, and 208, an internal load balancer 210, application instances 212, 214, and 216, and a network address translation (NAT) instance 218.

External load balancer 202 receives traffic from a plurality of end users 220 originating on the Internet and bound for an external facing service. The published address for the service can be the address of external load balancer 202. External load balancer 202 can send all the packets of a given stream to a single proxy instance, such as one of proxy instances 204, 206, or 208. In various embodiments, external load balancer 202 can allocate network streams to proxy instances 204, 206, and 208 according to the load experienced by each of the proxy instances. For example, if proxy instance 204 has the lowest load, the next incoming network stream can be allocated to proxy instance 204.

In various embodiments, when the aggregate load across the proxy instances exceeds a maximum load threshold, additionally proxy instances can be created, and additional streams can be allocated to the new proxy instance. Alternatively, when the aggregate load is below a minimum load threshold, a proxy instance can be destroyed. In some embodiments, the load balancer may not allocate additional streams to a proxy instance marked for destruction and when all the network streams being handled by the marked proxy instance end, the proxy instance can be terminated. Alternatively, the proxy instance can be marked for destruction and the network streams currently allocated to the marked proxy instance can be reallocated to the other proxy instances and the marked proxy instance can be destroyed.

Proxy instances 204, 206, and 208 can inspect the packets, such as by comparing the packets to a traffic signature of a known malicious network activity. When the packets of a network stream match a traffic signature, the proxy server can execute a countermeasure corresponding to the traffic signature. In absence of a matched traffic signature, the proxy service can send the packets to load balancer 210. Should one or more packets of a stream match a network signature, the packet and all subsequent packets for that stream can be discarded or other actions performed according to the associated countermeasure. Additionally, an alert record can be written with details of the finding.

Figure 3:
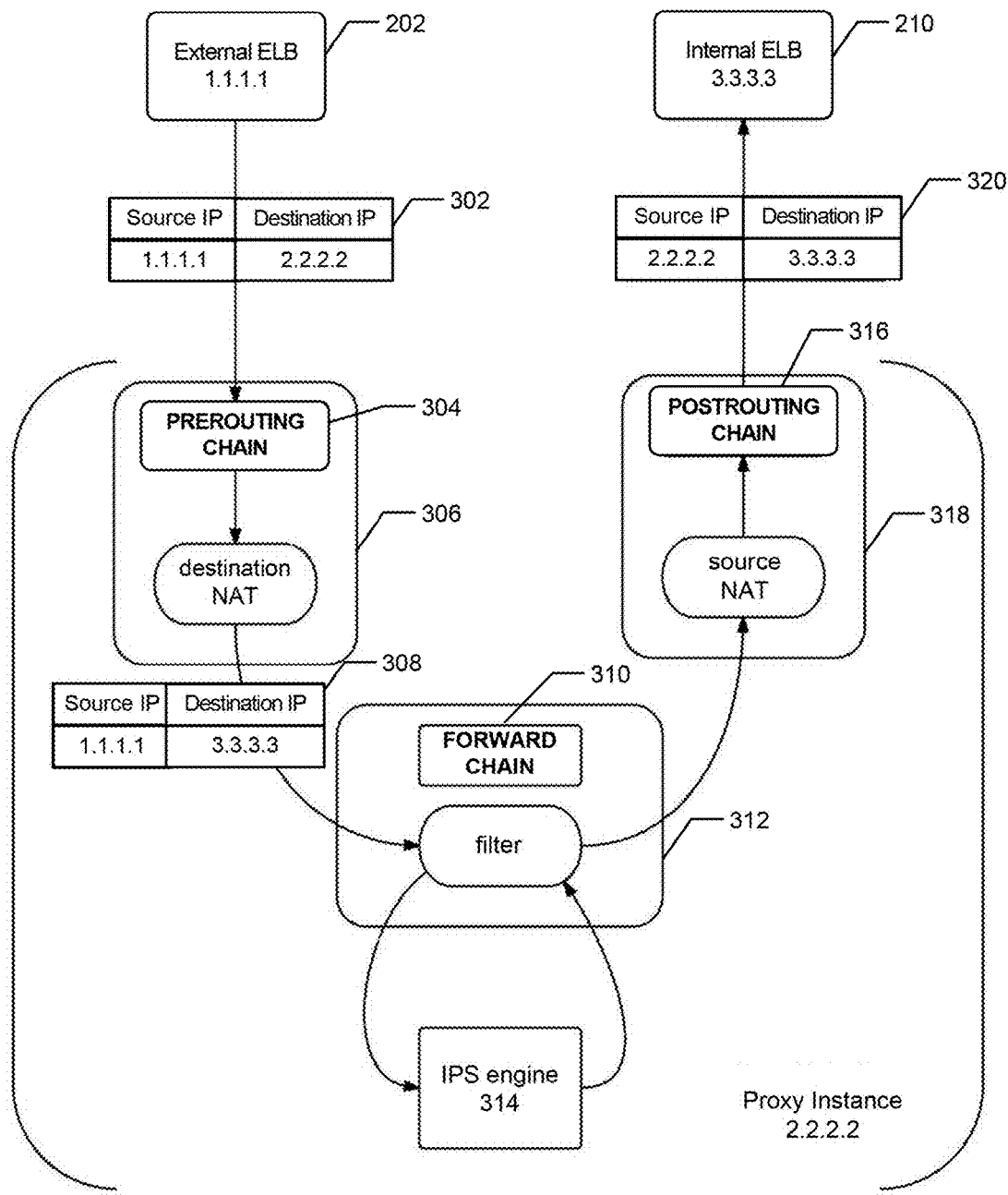
FIG. 3 is a block diagram illustrating packet inspection for network packets inbound from client systems to the cloud system, in accordance with various embodiments.

In various embodiments, packets coming from the external load balancer 202 can have the source address of the external load balancer 202 and the destination address of one of the proxy instances, such as proxy instance 204, as illustrated by source/destination pair 302 of FIG. 3. The proxy instance 204 can receive a packet and processes it according to rules present in the Linux kernel iptables system. These rules can be organized by tables and chains, which control when and if they are applied. The PREROUTING chain 304 in the NAT table 306 of proxy instance 204 can have a rule that alters the destination address of packets coming from the external load balancer 202 to that of the internal load balancer 210, as illustrated by the source/destination pair 308. Since the new destination address is non-local, the FORWARD chain 310 in the filter table 312 is applied. A rule there can queue the packet for inspection by the IPS engine 314. The engine can compare the packet and the data stream of which it is a part to signatures and countermeasures, arriving at a verdict. The verdict, communicated back to the kernel, can indicate whether or not the packet should be discarded. For packets not discarded, the POSTROUTING chain 316 in the NAT table 318 can change the source address of the packet to that of proxy instance 204, as illustrated by source/destination pair 320. The resulting packet can be written to the network, to be received by the internal load balancer 210.

Returning to FIG. 2, internal load balancer 210 can receive the filtered traffic from the proxy instances and allocate the filtered network streams to the application instances 212, 214, and 216. In various embodiments, load balancer 210 can allocate network streams to application instances 212, 214, and 216 according to the load experienced by each of the application instances. For example, if application instance 212 has the lowest load, the next incoming network stream can be allocated to application instance 212.

Application instances 212, 214, and 216 can receive and process the network streams to respond to the requests. For example, the network streams can represent request to a web service. The application instances 212, 214, and 216 can receive the requests and respond to the request with the appropriate data.

In various embodiments, the destination service can send reply packets with a source address of the destination service and a destination address of one of the proxy instances, such as proxy instance 204. The Linux kernel iptables system can recognize the packet is a reply, and can change the source address to that of the proxy instance 204 and the destination to the external load balancer 202. The packet can queued for the IPS engine, which can inspect and deliver a verdict. Non-discarded packets can be written to the network to be received by the external load balancer 202, and from there ultimately to the end users 220.

In various embodiments, responding to the requests may require access to data stored at a remote server or data store 222. In those circumstances, the application instances 212, 214, and 216 can send a request for the required data to the remote server or data store 222 via NAT instance 218.

NAT instance 218 can inspect traffic originating at the application instances 212, 214, and 216 and provide network address translation before forwarding the traffic to an external network, such as the Internet or a VPN, to reach the remote server or data store 222.

Figure 4:
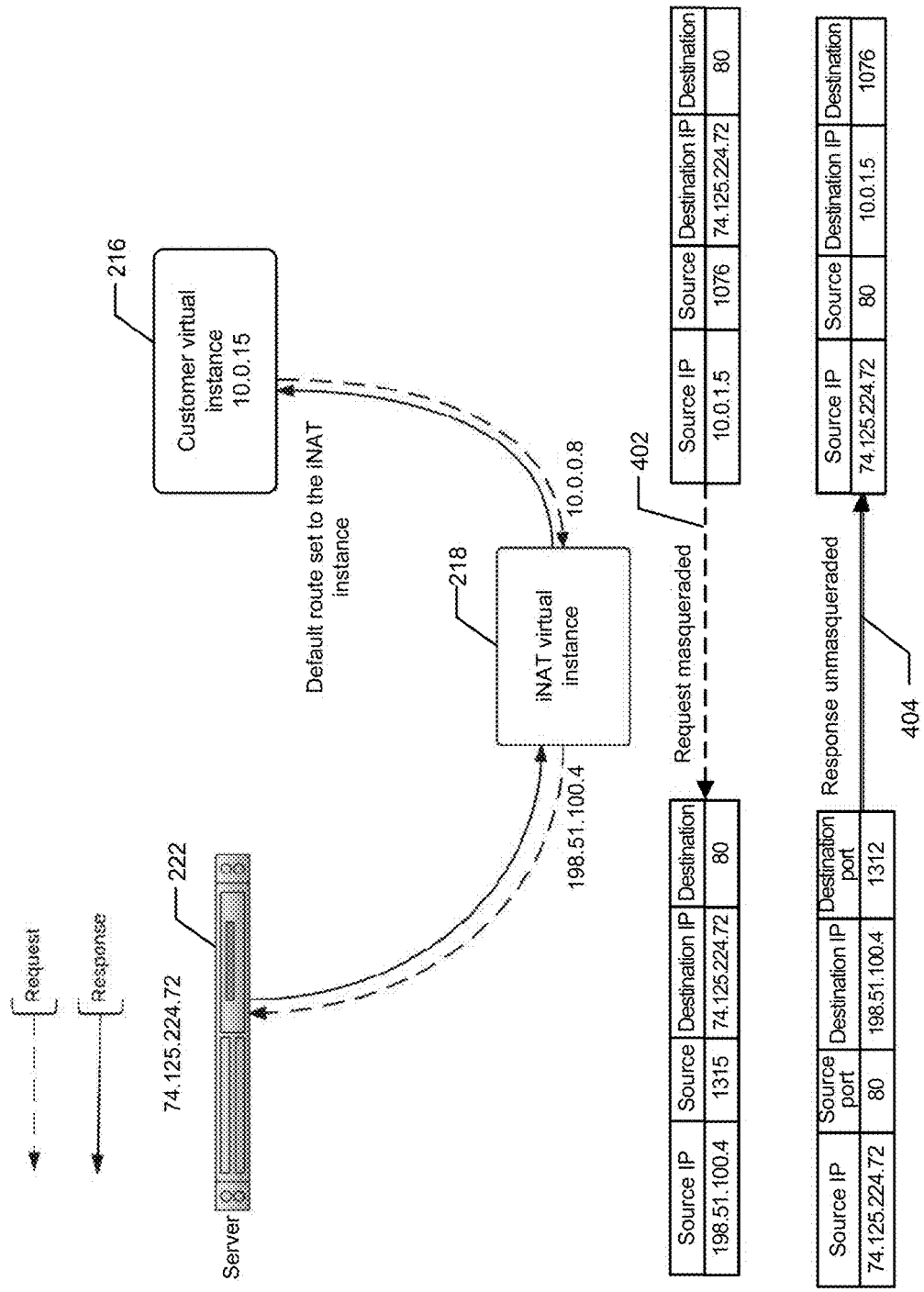
FIG. 4 is a block diagram illustrating packet inspection for network packets outbound from the cloud system to a backend server, in accordance with various embodiments.

In various embodiments, with reference to FIG. 4, traffic originating on the customer's instances and bound for hosts outside the customer's network consists of streams of packet which, by means of a default route entry for each subnet, pass through the NAT instance 218. Packets from an internal instance, such as application instance 212, can have that instance's source IP address, and the destination address of an external host 222. These packets, arriving on the NAT instance 218 with a non-local destination address can be subject to rules from the FORWARD chain in the NAT table. A rule in that chain can queue the packet for inspection by the IPS engine. As with the proxy instances 204, 206, and 208, the engine can inspect the packet and stream to deliver a verdict. When a countermeasure has matched, the packet and all future packets for that stream can be discarded. Non-discarded packets can be subject to a rule in the POSTROUTING chain in the NAT table which enables network address port translation (NAPT), using the MASQUERADE iptables target. For NAPT, the kernel can maintain a map of tuples identifying the original address and port and destination address and port of each stream. If the tuple for a given stream is not unique in the map, a source port can be chosen to make the tuple unique. The kernel can replace the source address of the packet with the address of the NAT instance 218, and can replace the source port if dictated by the mapping, as illustrated at 402. The packet can be written to the network. A reply packet from the server 222 can arrive at the NAT instance 218, addressed to the NAT instance 218. The mapping of unique tuples is used to rewrite the destination address and, if necessary, the destination port, as shown at 404. The packet is queued, inspected, and given a verdict by the same mechanism as the outbound packet. If not discarded, the packet is written to the network, to ultimately arrive at application instance 212 that originated the stream.

Figure 5:
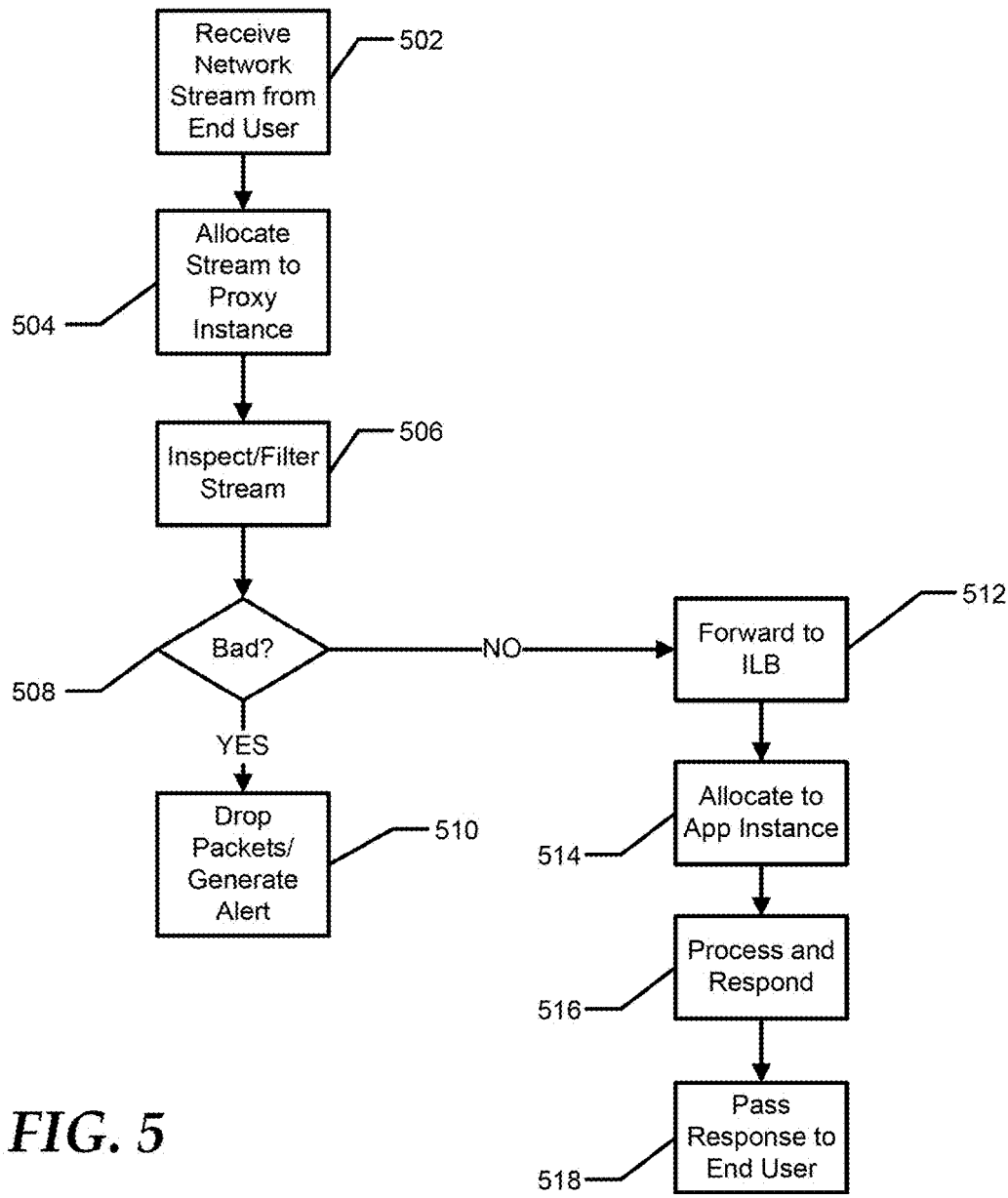
FIGS. 5 and 6 are flow diagrams illustrating a method for scalable packet inspection in the cloud, in accordance with various embodiments.

In various embodiments, the NAT instance 218, or another instance, can act as a master instance, propagated configuration and rule changes, software updates, and the like to the proxy instances 204, 206, and 208. Additionally, the master instance FIG. 5 is a flow diagram illustrating a method for scalable packet inspection. At 502, the system can receive a network stream originating at an end user. The network stream can be received from an external network, such as the Internet, at a load balancer, such as external load balancer 202. At 504, the load balancer can allocate the stream to a proxy instance. In various embodiments, the stream can be allocated based on the load on the proxy instances.

At 506, the proxy instance can inspect and filter the network stream. For example, the proxy instance can perform deep packet inspection to identify malicious packets by inspecting any or all of network layers 3 to 7 (3-Network Layer, 4-Transport Layer, 5-Session Layer, 6-Presentation Layer, 7-Application Layer). At 508, it can be determined if the network stream is malicious. When the network stream is determined to be malicious, packets of the network stream can be dropped and/or an alert can be generated, as indicated at 510. In various embodiments, the proxy instance can behave as an Intrusion Prevention System by discarding packets identified as malicious, and/or an Intrusion Detection System by generating an alert when malicious network activity is identified.

Alternatively, as indicated at 512, if the network stream is not determined to be malicious, the network packets can be forwarded to an internal load balancer, such as internal load balancer 210. At 514, the internal load balancer can allocate the network stream to an application instance. The application instance can process and respond to the network stream at 516, and at 518, the response can be passed to the end user. In returning to the end user, the packets of the network stream may need to pass back through one or more of the internal load balancer, the proxy instance, and the external load balancer.

Figure 6:
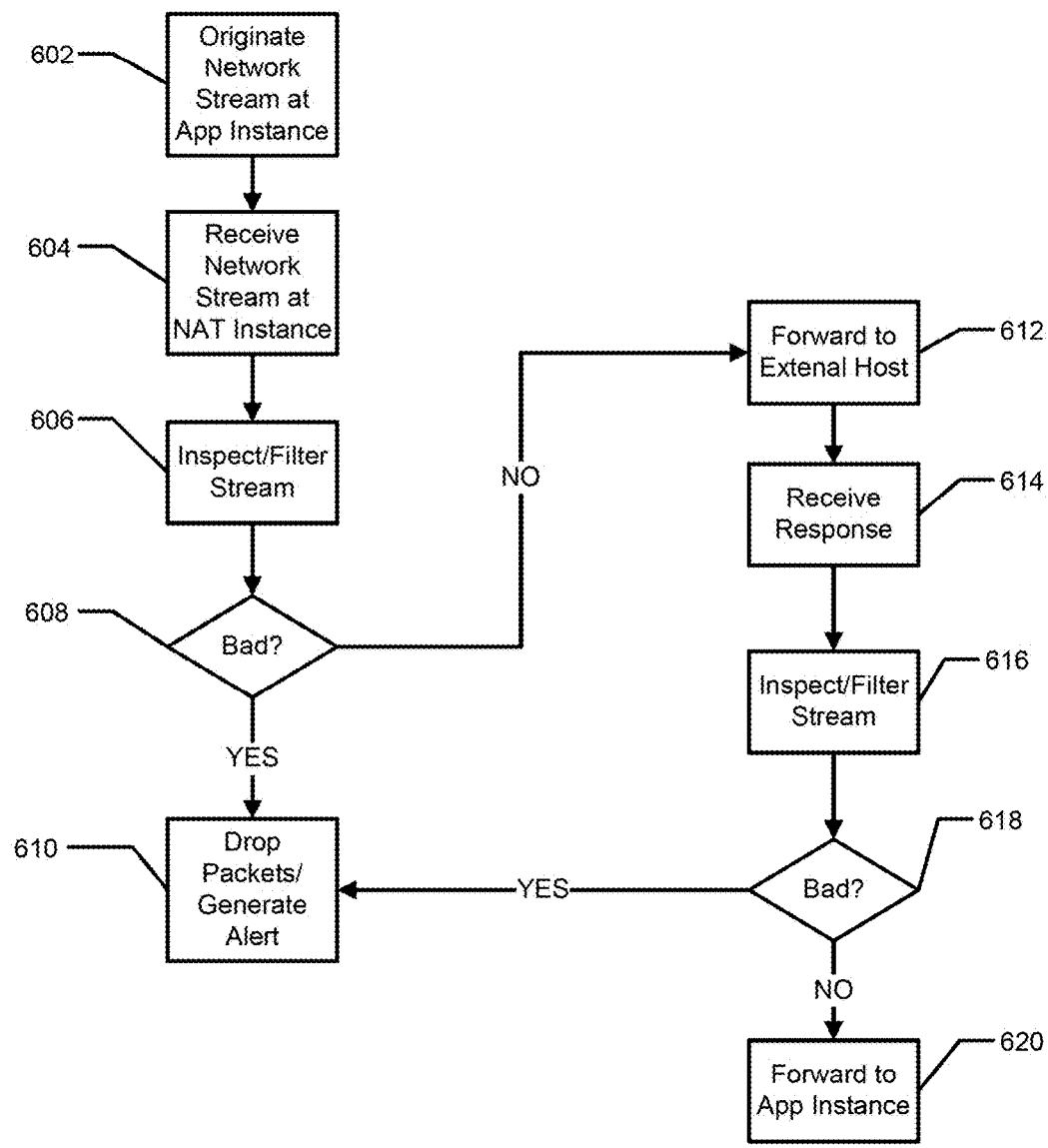

FIG. 6 is a flow diagram illustrating a method for scalable packet inspection. At 602, an application instance, such as application instance 216, can originate a network stream to obtain information from or provide information to an external host, such as server 222. At 604, a NAT instance, such as NAT instance 218, can receive the network stream.

At 606, the NAT instance can inspect and filter the outbound packets of the network stream. For example, the NAT instance can perform deep packet inspection to identify malicious packets by inspecting any or all of network layers 3 to 7 (3-Network Layer, 4-Transport Layer, 5-Session Layer, 6-Presentation Layer, 7-Application Layer). At 608, it can be determined if the network stream is malicious. When the network stream is determined to be malicious, packets of the network stream can be dropped and/or an alert can be generated, as indicated at 610. In various embodiments, the NAT instance can behave as an Intrusion Prevention System by discarding packets identified as malicious, and/or an Intrusion Detection System by generating an alert when malicious network activity is identified.

Alternatively, as indicated at 612, if the network stream is not determined to be malicious, the network packets can be forwarded to the external host.

At 614, the response from the external host can be received by the NAT instance. The NAT instance can inspect and filter the inbound packets of the network stream, and, at 618, it can be determined if the network stream is malicious. When the network stream is determined to be malicious, packets of the network stream can be dropped and/or an alert can be generated, as previously indicated at 610.

Alternatively, when the inbound packets of the network stream are not determined to be malicious, the packets can be forwarded to the application instance, as indicated at 620.

Figure 7:
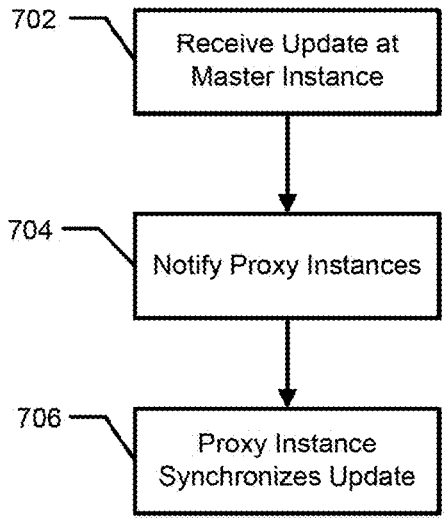
FIG. 7 is a flow diagram illustrating a method of updating software and configurations for virtual proxy instances, in accordance with various embodiments.

FIG. 7 is a flow diagram illustrating a method for updating proxy instances. In various embodiments, updates to the rules and/or the software being executed on the proxy instances may be needed. An administrator can push rule or configuration changes or software updates to a master instance, as indicated at 702. In some embodiments, a single instance can perform the functions of the NAT instance and the master instance.

At 704, the master instance can notify the proxy instances that an update is available, and at 706, the proxy instances can synchronize the update held by the master instance with the local information. In various embodiments, in addition to the master instance notifying the proxy instances of a chance, the proxy instances may periodically check with the master instance to determine if changes need to be synchronized.

Figure 8:
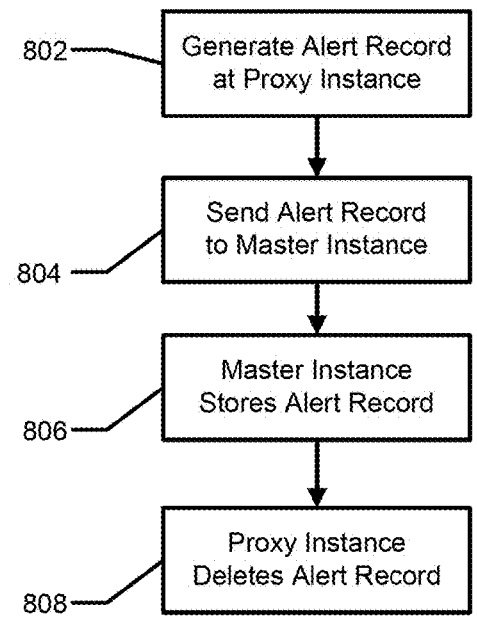
FIG. 8 is a flow diagram illustrating a method for receiving alerts from virtual proxy instances, in accordance with various embodiments.

FIG. 8 is a flow diagram illustrating a method for logging alert records. In various embodiments, alert records may need to be logged at a central location, such as the master instance. Logging the alerts at the master instance can ease access to the alerts (one central location for review of the alerts rather than accessing each proxy instance) and can preserve the logs when a proxy instance is destroyed, such as due to reduced load on the system. At 802, a proxy instance, such as proxy instance 208 can generate an alert record. The alert record can record the time of the alert, the rule or signature that was matched, and other identifying information, such as the source and destination of the packets, and the like.

At 804, the proxy instance can send the alert record to the master instance, and at 806, the master instance can store the alert record. In various embodiments, when the record is successfully received and stored by the master instance, the master instance can acknowledge the alert record and the proxy instance can delete the alert record, as indicated at 808. In various embodiments, deleting the alert records from the proxy instance can reduce the needed storage capacity of the proxy instances.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for packet inspection in a computer network, comprising:
   receiving a plurality of network streams from a plurality of client systems at a first load balancer;
   allocating the network streams across a plurality of proxy instances;
   inspecting and filtering the network streams by the proxy instances;
   forwarding the filtered network streams to a second load balancer;
   allocating the filtered network streams to a plurality of application instances; and
   processing and responding to the network streams at the application instances;
   inspecting and filtering the responses to the network streams by the proxy instances;
   forwarding the response to the client systems.

2. The method of claim 1, further comprising:
   originating by at least one of the application instances a second data stream to a external host;
   receiving the second data stream at a Network Address Translation instance;
   inspecting and filtering the second data stream by the Network Address Translation instance;
   forwarding the filtered second data stream to the external host;
   receiving a response from the external host at the Network Address Translation instance; and
   inspecting, filtering, and forwarding the response to the at least one of the application instances.

3. The method of claim 1, further comprising:
   receiving, at a master instance, a software or configuration change;
   providing a notification from the master instance to the proxy instances that the software or configuration change is available; and
   each proxy instance synchronizing the software or configuration change at the master instance with a local software or configuration.

4. The method of claim 1, further comprising:
   sending an alert from a proxy instance to a master instance when the inspecting and filtering triggers an event;
   acknowledging by the master instance that the alert has been received and recorded; and
   deleting a record of the alert at the proxy instance in response to the acknowledgement.

5. The method of claim 1, further comprising
   dynamically provisioning an additional proxy instance when a load across the proxy instances exceeds a threshold.

6. The method of claim 1, wherein inspecting and filtering includes comparing the signatures and discarding packets of a network stream when the packets match a signature.

7. A system for packet inspection in a computer network, comprising:
   a first load balancer configured to receive a plurality of network streams from a plurality of client systems, and to allocate the network streams across a plurality of proxy instances;
   the proxy instances configured to:
      inspect and filter the network streams;
      forward the filtered network streams to a second load balancer;
      inspect and filter responses to the network streams; and
      forward the filtered response to the client systems;
   the second load balancer configured to allocate the filtered network streams to a plurality of application instances; and
   the application instances configured to process and respond to the network streams.

8. The system of claim 7, wherein the proxy instances are configured to inspect the network stream at one or more of the network layer, the transport layer, the session layer, the presentation layer and the application layer.

9. The system of claim 7, further comprising:
   a Network Address Translation instance configured to:
      receive a second data stream originated by at least one of the application instances containing a request for an external host;
      inspect and filter the second data stream;
      forward the filtered second data stream to the external host;
      receive a response from the external host;
      inspecting, filtering, and forwarding the response to the originating application instance.

10. The system of claim 7, further comprising:
a master instance configured to:
  receive a software or configuration change; and
  provide a notification to the proxy instances that the software or configuration change is available;
wherein the proxy instances are further configured to:
  synchronize the software or configuration change at the master instance with a local software or configuration.

11. The system of claim 7, wherein:
the proxy instances are configured to:
  send an alert from a proxy instance to a master instance when the inspecting and filtering triggers an event; and
  delete a record of the alert at the proxy instance in response to the acknowledgement by the master instance; and
wherein the master instance is further configured to:
  store the alert; and
  acknowledge the alert has been received and recorded.

12. The system of claim 7, wherein additional proxy instance are dynamically provisioned when a load across the proxy instances exceeds a threshold.

13. The system of claim 7, wherein inspecting and filtering includes comparing the signatures and discarding packets of a network stream when the packets match a signature.

14. A system for packet inspection in a computer network, comprising:
a first load balancer configured to allocate a plurality of network streams across a plurality of proxy instances;
a second load balancer configured to allocate the filtered network streams to a plurality of application instances;
the proxy instances configured to:
  inspect and filter the network streams;
  forward the filtered network streams to the second load balancer;
  inspect and filter responses to the network streams; and
  forward the filtered response to the client systems;
the application instances configured to:
  process and respond to the network streams; and
  originate a second data stream to obtain data from an external host;
a Network Address Translation instance configured to:
  inspect and filter the second data stream;
  forward the filtered second data stream to the external host;
  receive a response from the external host; and
  inspect, filter, and forward the response to the originating application instance.

15. The system of claim 14, wherein the proxy instances are configured to inspect the network stream at one or more of the network layer, the transport layer, the session layer, the presentation layer and the application layer.

16. The system of claim 14, further comprising:
a master instance configured to:
  receive a software or configuration change; and
  provide a notification to the proxy instances that the software or configuration change is available;
wherein the proxy instances are further configured to:
  synchronize the software or configuration change at the master instance with a local software or configuration.

17. The system of claim 16, wherein the Network Address Translation instance is configured to perform the functions of the master instance.

18. The system of claim 14, wherein:
the proxy instances are configured to:
  send an alert from a proxy instance to a master instance when the inspecting and filtering triggers an event; and
  delete a record of the alert at the proxy instance in response to the acknowledgement by the master instance; and
wherein the master instance is further configured to:
  store the alert; and
  acknowledge the alert has been received and recorded.

19. The system of claim 14, wherein additional proxy instance are dynamically provisioned when a load across the proxy instances exceeds a threshold.

20. The system of claim 14, wherein inspecting and filtering includes comparing the signatures and discarding packets of a network stream when the packets match a signature.

* * * * *